(12) United States Patent
Kokkonen et al.

(10) Patent No.: US 7,016,892 B1
(45) Date of Patent: Mar. 21, 2006

(54) APPARATUS AND METHOD FOR DELIVERING INFORMATION OVER A NETWORK

(75) Inventors: Erik D. Kokkonen, San Francisco, CA (US); Daniel E. Dreilinger, San Francisco, CA (US); Sean E. Dreilinger, San Francisco, CA (US); Gregory L. Coleman, Oakland, CA (US); Amy E. Martel, San Francisco, CA (US)

(73) Assignee: CNET Networks, Inc., San Francisco, CA (US)

( * ) Notice: Subject to any disclaimer, the term of this patent is extended or adjusted under 35 U.S.C. 154(b) by 283 days.

(21) Appl. No.: 09/715,348

(22) Filed: Nov. 17, 2000

(51) Int. Cl.
*G06F 7/00* (2006.01)
*G06F 17/60* (2006.01)

(52) U.S. Cl. .......................... 707/3; 707/104.1; 705/26

(58) Field of Classification Search .............. 707/1–10, 707/104.1, 100–102, 200; 709/201, 229, 709/217, 219; 705/27, 26; 715/501.1
See application file for complete search history.

(56) References Cited

U.S. PATENT DOCUMENTS

| | | | | |
|---|---|---|---|---|
| 5,864,845 A | | 1/1999 | Voorhees et al. | |
| 5,873,080 A | | 2/1999 | Coden et al. | |
| 5,924,090 A | * | 7/1999 | Krellenstein | 707/5 |
| 5,937,392 A | * | 8/1999 | Alberts | 705/14 |
| 5,960,429 A | * | 9/1999 | Peercy et al. | 707/5 |
| 6,070,158 A | * | 5/2000 | Kirsch et al. | 707/3 |
| 6,078,866 A | * | 6/2000 | Buck et al. | 702/2 |
| 6,144,958 A | * | 11/2000 | Ortega et al. | 707/5 |
| 6,185,558 B1 | * | 2/2001 | Bowman et al. | 707/5 |
| 6,266,649 B1 | * | 7/2001 | Linden et al. | 705/26 |
| 6,269,361 B1 | * | 7/2001 | Davis et al. | 707/3 |
| 6,397,228 B1 | * | 5/2002 | Lamburt et al. | 707/203 |
| 6,405,175 B1 | * | 6/2002 | Ng | 705/14 |
| 6,408,294 B1 | * | 6/2002 | Getchius et al. | 707/5 |
| 6,421,675 B1 | * | 7/2002 | Ryan et al. | 707/100 |
| 6,466,918 B1 | * | 10/2002 | Spiegel et al. | 705/27 |
| 6,484,161 B1 | * | 11/2002 | Chipalkatti et al. | 707/3 |
| 6,487,557 B1 | * | 11/2002 | Nagatomo | 707/102 |
| 6,489,968 B1 | * | 12/2002 | Ortega et al. | 345/713 |
| 6,493,721 B1 | * | 12/2002 | Getchius et al. | 707/104.1 |
| 6,496,843 B1 | * | 12/2002 | Getchius et al. | 715/526 |

(Continued)

OTHER PUBLICATIONS

Chris Sherman, "Google Introduces Web Directory Using Netscape's Open Directory Project Data" NewsBreaks and Conference Reports, Mar. 27, 2003, pp. 1-2.*

(Continued)

*Primary Examiner*—Greta Robinson
*Assistant Examiner*—Miranda Le
(74) *Attorney, Agent, or Firm*—Marc S. Kaufman; Nixon Peabody, LLP

(57) ABSTRACT

A method of generating directed content is provided. In the method, a set of lists are received. Each list in the set of lists is associated with a respective web service and each list includes searches submitted to the associated web service. The set of lists are distilled into a frequency database. The frequency database stores search frequency information indicating, for respective searches, a frequency with respect to each of one or more of the plurality of web services. A query is obtained, and the query is used to perform a search for matches between the query and a search in the database. Matches having highest associated frequency are selected. Each selected match indicates a respective selected web service of the web services. Directed content is displayed based on one or more of the selected web services.

45 Claims, 4 Drawing Sheets

U.S. PATENT DOCUMENTS

| | | | |
|---|---|---|---|
| 6,546,393 B1 * | 4/2003 | Khan | 707/10 |
| 6,591,261 B1 * | 7/2003 | Arthurs | 707/2 |
| 6,615,237 B1 * | 9/2003 | Kyne et al. | 709/203 |
| 2003/0195877 A1 * | 10/2003 | Ford et al. | |

OTHER PUBLICATIONS

Dreilinger et al., "Experiences with Selecting Search Engines Using Meta-Search", 1996.

* cited by examiner

| Frequency list corresponding to web service 154-1 | Number times searched 78-1-1 | Number times searched 78-1-2 | Number times searched 78-1-3 | ... | Number times searched 78-1-N | Frequency list corresponding to web service 154-2 | Number times searched 78-2-1 | Number times searched 78-2-2 | Number times searched 78-2-3 | ... | Number times searched 78-2-N | ... | Frequency list corresponding to web service 154-N | Number times searched 78-3-1 | Number times searched 78-3-2 | Number times searched 78-3-3 | ... | Number times searched 78-3-N |
|---|---|---|---|---|---|---|---|---|---|---|---|---|---|---|---|---|---|---|
| 76-1 | Search string 80-1-1 | Search string 80-1-2 | Search string 80-1-3 | ... | Search string 80-1-N | 76-2 | Search string 80-2-1 | Search string 80-2-2 | Search string 80-2-3 | ... | Search string 80-2-N | ... | 76-N | Search string 80-3-1 | Search string 80-3-2 | Search string 80-3-3 | ... | Search string 80-3-N |

| | | | |
|---|---|---|---|
| 302-1 — Search string 1 | Web service 154 | Frequency 304-1-1 | Rank 306-1-1 |
| | ... | ... | ... |
| | Web service 154-M | Frequency 304-1-M | Rank 306-1-M |
| 302-2 — Search string 2 | Web service 154 | Frequency 304-2-1 | Rank 306-2-1 |
| | ... | ... | ... |
| | Web service 154-S | Frequency 304-2-S | Rank 306-2-S |
| ... | ... | ... | ... |
| 302-Z — Search string Z | Web service 154 | Frequency 304-Z-1 | Rank 306-Z-1 |
| | ... | ... | ... |
| | Web service 154-T | Frequency-T 304-Z-T | Rank-T 304-Z-T |

74

APPARATUS AND METHOD FOR DELIVERING INFORMATION OVER A NETWORK

The present invention relates generally to a system and method for generating directed content, such as links to web services or advertisements, in response to a query.

BACKGROUND OF THE INVENTION

The advent of the Internet has opened the door to a new channel of advertising. For example, a web page can display a banner advertisement at the top of the web page. Moreover, the subject matter of Internet-based advertisements can be changed on a dynamic basis. In this way, a web service can promote a series of different products and services through its web site. One problem facing the art of Internet advertising, however, is the targeting of advertisements so that they are relevant to the audience.

Several different mechanisms have been devised for identifying characteristics of a particular audience. For example, when a user selects a well known sports web site, web services can use this information to direct sports related advertisements to the user. Additionally, when a user conducts a search using a web service such as Excite, Yahoo, or Lycos, the search terms may be used to select a category of advertisements or indeed directly determine the advertisement itself. In one example, when a user enters search terms using a web service, an Amazon.com advertisement appears in the web page associated with the web service inviting the user to search Amazon.com for products related to the search term.

Just as the success of the Internet has made it more difficult for advertisers to characterize and efficiently communicate with their audience, the success of the Internet has also presented problems to Internet users. The success of the Internet has led to a vast array of web services, each catering to a particular audience. The average user simply does not have the resources and time to discover each of these web services. Furthermore, new web services appear on a daily basis while other web services disappear, making it even more difficult to determine which web services are best for a particular need. To address the difficulty of identifying the appropriate web service for a particular search query, a variety of metasearch engines have been developed. While the algorithms used by such search engines are functional, they are unsatisfactory in practice. Much of the unsatisfactory performance of metasearch engines results from the rigid method used by metasearch engines to identify candidate web services.

Accordingly, it is an object of the present invention to provide a system and method for identifying web services that are most likely to produce useful information for a given set of search terms. It is a further object of the present invention to provide a means for identifying content that is most likely to be of interest to a user. Such content includes advertisements that closely match a user's particular interests.

SUMMARY OF THE INVENTION

The present invention provides a system and method for identifying web advertisers and services that are most likely to contain information that is relevant to a given set of search terms. In the present invention, a frequency database is compiled by collecting a list from one or more participating web services. Each list includes the search terms that have been used to query the participating web service. This collection of lists is aggregated into the frequency database and indexed by the search terms from each of the lists. Then, a user provides a query, or set of search terms, using a web service that has access to the frequency database. The query provided by the user is matched against the search terms in the database. When a match is found, the frequency database allows for a quick determination of whether any participating web service has serviced the matching search at a relatively high frequency. The identity of such web services is used to generate directed content, such as links to the identified web services or the display of advertisements that are selected as a function of the identity of the web service. In this way, web services that are likely to provide beneficial information are chosen.

In one embodiment, present invention provides a method generating directed content. In the method, a set of lists is received. Each list in the set of lists is associated with a respective web service and each list in the set of lists includes searches submitted to the web service associated with the list. The lists are distilled into a frequency database that stores search frequency information. The search frequency information indicates, for respective searches, the search frequency with respect to each of one or more of the plurality of web services. Then, a query is obtained. The frequency database is searched for matches between the query and a search in the database. Matches having the highest associated frequency are selected. Each selected match indicates a respective selected web service. Directed content is displayed based on one or more of the selected web services. In one embodiment, the directed content is a link to the web service that is associated with the query by a high frequency. Another embodiment further includes the step of identifying a category that corresponds to a web service associated to the query by a high frequency. In such embodiments, the directed content includes an advertisement that corresponds to the identified category.

In some embodiments of the present invention, a match having high associated frequency is determined by a rank of a search, which matches the obtained query, in a list associated with a web service in the plurality of web services. In other embodiments of the present invention, a match having high associated frequency is determined by a score that is a function of the quotient of (i), a rank of a search, which matches the obtained query, in a list associated with a web service in the plurality of web services and (ii), the logarithm of the frequency of the search in the list. In yet other embodiment, other functions may be used to rank the web services having a matching search term in their respective search frequency lists.

In some embodiments of the present invention, the directed content is an advertisement. In such embodiments, the method further comprises routing the query to an instance of a web service that was selected during the searching step. A response generated by the selected web service upon presentation of the query is collected and a portion of this response is included in the advertisement.

Another embodiment of the present invention is a method of generating directed content. In this method, a plurality of lists is received. Each list in the plurality of lists is associated with a respective web service and each list includes searches submitted to the respective web service. Each list in the plurality of lists is distilled into a frequency sorted list. The frequency sorted list includes a plurality of entries, each entry having a search and a number of times the search was submitted to a respective web service. Then, a query is obtained. The frequency sorted list is searched for matches between the query and a search in the frequency sorted list. The matches having the highest associated frequency are selected. Each selected match indicates a respective selected web service. Directed content is displayed based on one or more of the selected web services.

Yet another embodiment of the present invention is a computer program product for use in conjunction with a computer system. The computer program product comprises a computer readable storage medium and a computer program mechanism embedded therein. The computer program mechanism includes a frequency database for storing search frequency information and a program module for generating directed content. The program module comprises instructions for receiving a set of lists, each list in the set of lists associated with a respective web service in a plurality of web services and each list in the set of lists including searches submitted to the respective web service. The program module further comprises instructions for distilling the set of lists into the frequency database so that the frequency database stores search frequency information indicating, for respective searches, a frequency with respect to each of one or more of a plurality of web services. The program module additionally comprises instructions for obtaining a query and for searching the frequency database for matches between the query and a search in the database. Matches having highest associated frequency are selected, each selected match indicating a respective selected web service of the web services. The program module further comprises instructions for displaying directed content based on one or more of the selected web services, thereby generating the directed content.

Still another embodiment of the present invention provides a computer system for generating directed content. The computer system comprises a central processing unit and a memory coupled to the central processing unit. The memory includes a frequency database for storing search frequency information as well as a program module for generating directed content. The program module comprises instructions for receiving a set of lists, each list in the set of lists associated with a respective web service in a plurality of web services and each list in the set of lists including searches submitted to the respective web service. The program module also comprises instructions for distilling the set of lists into the frequency database so that the database stores search frequency information that indicates, for respective searches, a frequency with respect to each of one or more of a plurality of web services. The program module further comprises instructions for obtaining a query and for searching the frequency database for matches between the query and a search in the database. These instructions provide for the selection of matches having highest associated frequency, each selected match indicating a respective selected web service of the web services. Further, the program module includes instructions for displaying directed content based on one or more of the selected web services.

BRIEF DESCRIPTION OF THE DRAWINGS

Additional objects and features of the invention will be more readily apparent from the following detailed description and appended claims when taken in conjunction with the drawings, in which:

FIG. 2 depicts a data structure that includes a set of lists, each list associated with a respective web service and each list including searches submitted to the respective web service and the frequency with which the search is submitted, in accordance with one embodiment of the present invention.

FIG. 3 shows a frequency database in accordance with one embodiment of the present invention.

DESCRIPTION OF THE PREFERRED EMBODIMENTS

The present invention provides a system and method for identifying the web services most likely to contain information relevant to a particular search query. Central to the invention is a unique frequency database that is formed by collecting a list from each of one or more participating web services. Representative web services include engines such as CNET's Shopper.com and Amazon.com's Lawn & Patio Store. Each list includes the search terms that were used to query the participating web service and the relative frequency that such queries were made. The collection of lists is aggregated into the frequency database and indexed by the search terms from each of the lists. In some embodiments, the frequency database is regenerated on a periodic basis by collecting a new list from each of the participating web services.

The frequency database is used to identify which of the participating web services will most likely have content of interest to a user. The premise is that web services that have been queried on a particular subject matter on a frequent basis are more likely to contain informative content on the given subject matter than web services that are infrequently queried for the given subject matter. A user provides a query, or set of search terms, using a web service that has access to the frequency database. The query provided by the user is matched against the search terms in the database. When a match is found, the frequency database is used to determine whether any participating web service has serviced the matching search at a relatively high frequency. The identity of such web services is used to generate directed content, such as links to the identified web services or the display of advertisements that are selected as a function of the identity of the web service.

Figure 1:
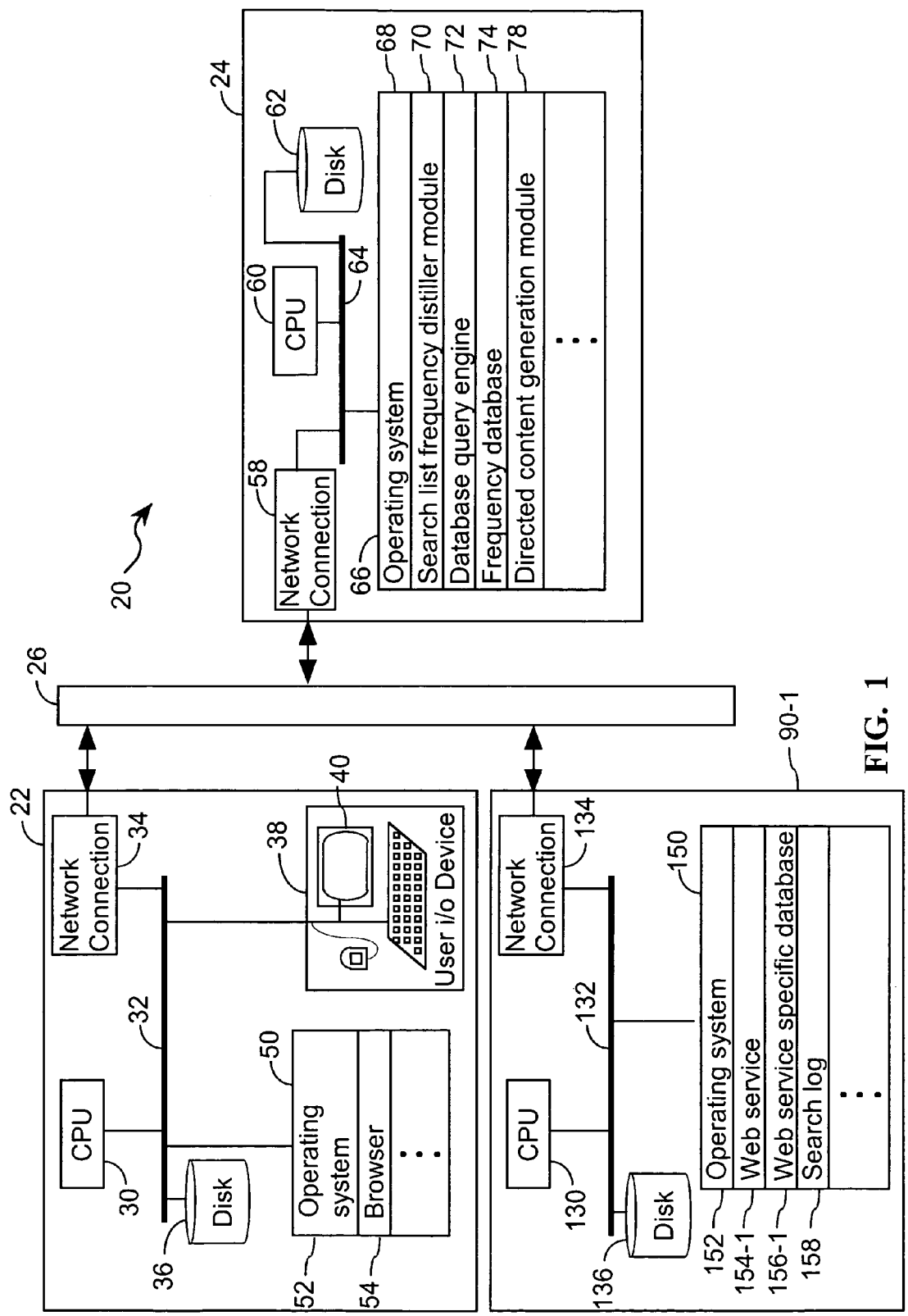
FIG. 1 is a block diagram of a system for generating directed content in accordance with one embodiment of the present invention.

FIG. 1 shows a system, such as system 20, for generating directed content in accordance with the present invention. The system includes a client 22 for entry of a query by a user, a server 24 for storage of a frequency database 74, and one or more web servers 90, each web server 90 representing a different web service 154. Client 22, web server 90, and server 24 are connected by transmission channel 26. Transmission channel 26 is any wired or wireless communication network or combination of such communication networks.

Client 22 preferably includes:
a central processing unit 30;
a main non-volatile storage unit 36, preferably a hard disk drive, for storing software and data;
a system memory 50, preferably high speed random-access memory (RAM), for storing system control programs, data, and application programs, including programs and data loaded from disk 36; system memory 50 may also include read-only memory (ROM);

a user interface 38, including one or more input devices and a display 40;

a network connection 34 for connecting client 22 to transmission channel 26; and an internal bus 32 for interconnecting the aforementioned elements of the client.

Operation of client 22 is controlled primarily by operating system 52, which is executed by central processing unit 30. Operating system 52 may be stored in system memory 50. In a typical implementation, system memory 50 includes:

operating system 52; and browser 54 for providing a user with access to a web page that allows for the submission of a query.

Each web server 90 preferably includes:

a central processing unit 130;

a main non-volatile storage unit 136, preferably a hard disk drive, for storing software and data;

a system memory 150, preferably high speed random-access memory (RAM), for storing system control programs, data, and application programs, including programs and data loaded from disk 136; system memory 150 may also include read-only memory (ROM);

a network connection 134 for connecting web server 90 to transmission channel 26; and an internal bus 132 for interconnecting the aforementioned elements of the client.

Operation of web server 90 is controlled primarily by operating system 152, which is executed by central processing unit 130. Operating system 152 may be stored in system memory 150. In a typical implementation, system memory 150 includes:

operating system 152;

a web service 154, such as a search engine, for querying data pooled from the Internet or proprietary resources;

a web service specific database 156 used by web service 154 to identify content related to a user provide query;

a search log 158 used by the web service to record each search query received by the web service; and optionally, a frequency list 76-1 that contains search frequency information distilled from the search log 158.

It will be appreciated that there is no requirement that each web service 154 reside on a different web server 90. Indeed, any number of web services 154 may reside on a single web server 90.

Server 24 preferably includes:

a central processing unit 60;

a main non-volatile storage unit 62, preferably a hard disk drive, for storing software and data;

a system memory 66, preferably high speed random-access memory (RAM), for storing system control programs, data, and application programs, including programs and data loaded from disk 62; system memory 66 may also include read-only memory (ROM);

a network connection 58 for connecting server 24 to transmission channel 26; and an internal bus 64 for interconnecting the aforementioned elements of the client.

Operation of server 24 is controlled primarily by operating system 68, which is executed by central processing unit 60. Operating system 68 may be stored in system memory 66. In a typical implementation, system memory 66 includes:

operating system 68;

a search list frequency distiller module 70 for receiving search lists 76 from each web service 154 and for distilling the lists into frequency database 74;

frequency database 74 for storing search frequency information that indicates, for respective searches, a frequency with respect to each of one or more of the web services 154;

directed content generation module 78 for forwarding directed content to browser 54 in response to a query from client 22, the directed content determined by a match between the query from client 22 and a search in frequency database 74.

Overview

Using the system and method of the present invention, the most popular searches entered by users at a large number of web services 154 are identified. Each search made by a user at a web service 154 is stored in a list 76 that is associated with the web service. Because of the unique topical nature and audience of each web service 154, each list 76 is typically very distinct. The lists 76 are aggregated into a frequency database 74, which is consulted each time a user queries a web site that has access to frequency database 74. For each such user query, matches between the query and searches in frequency database 74 are identified. The web services 154 to which the search was made are scored based on factors such as the frequency that the respective web services were used to perform the search. The identity of high scoring web services is used to form directed content that is provided to the originator of the user query.

The present invention provides numerous advantages. The technology can be used to improve advertisement targeting. That is, advertisements can be targeted depending on how well they match a particular classification of a web service 154 that is highly scored. Furthermore, the present invention allows for improved metasearching. For example, rather than rigidly adhering to an algorithm that searches a fixed number of web services, metasearch engines can utilize the methods of the present invention to identify which web services are most likely to contain relevant information. The present invention is further advantageous because it automatically adapts to topical shifts that arise over time. For example, when a specific subject is making headline news, a news web service 154 such as News.com will receive a high score as users query the web service about the newsbreaking subject. Over time, as news articles about the subject decline, news web services 154 lose their high scores whereas the scores for more general web services such as excite.com will increase.

In one embodiment, the methods of the present invention are used to generate directed advertisements that are composed of metasearch results. Based on a user query, a web service that is particularly relevant to the query is identified. Then, the query is routed to the identified web service, resulting in a response by the web service. A portion of this response is then used as the basis of a directed advertisement. One example of this form of directed advertising is the identification of one or more books at a web site such as Amazon.com having title words that include the query provided by the user.

Detailed Operation

The operation of system 20 will now be described with reference to FIGS. 2 through 4.

FIG. 2 illustrates a collection of lists 76. Each list 76 corresponds to a respective web service 154. Representative web services 154 include portals, search engines, or any computer program that allows users to enter search terms 80. Each web service maintains a search log 158 of the search queries received by that service, and either periodically or at the request of the server 24 sends the search log, or a list of search queries extracted from the search log (e.g., the log records for a specified period of time) to the server 24. The server 24, as part of the process of producing its frequency database, distills the search log or list received from each web service into a frequency list, which indicates the number of times each search term or term has been submitted in search queries to the participating web service. The search lists received from a web service may include additional information, such as the ip address of the requester, and that information may be taken into account in the distillation process, for instance by removing from the search list duplicate searches received from the same requester (i.e., from the same ip address).

Alternately, some or all of the web services 90 may perform the distillation operation on their log of search queries so as to produce a respective frequency list for each web service, and then transfers the resulting frequency list to the server 24. Thus, some web services may send raw search queries lists to the server 24 while others send distilled frequency lists.

An example of the frequency list 76 corresponding to the web service 154 CNET News.com could be:

| | |
|---|---|
| 247 | napster |
| 83 | presidential debate |
| 72 | debate |
| 66 | amd |
| 53 | intel |
| 48 | science |
| 47 | ibm |
| 43 | yahoo |
| 41 | weather |
| 36 | dell |
| 35 | oracle |
| 34 | microsoft |
| 33 | israel |
| 33 | linux |
| . . . [several thousand more elided for brevity] | |

Although the frequency lists 76 represented in FIG. 2 only include frequency and search terms, the presence of additional data, such as demographic information, is within the scope of the present invention. In one embodiment, contributions to a frequency list 76 are limited to one instance of any unique query per IP address per day. In another embodiment, the frequency list 76 is truncated by taking only a predefined number of the most frequent searches. For example, in one implementation of the present invention, only the top 10,000 searches for any given web service 154 are included in the frequency list 76 for that web service. Each frequency list 76 may be generated and stored in the web server 90 that hosts the corresponding web service 154, or it may be generated by the server 24.

Referring to FIG. 3, an example of a representative frequency database 74 is shown. The representative database 74 is indexed by search strings 302. Search strings 302 are copied from individual lists 76 associated with each of the participating web services 154. It is expected that, for many of the search strings 302, there will exist more than one web service 154 that processed queries containing the search string. Accordingly, for each search string 302, there exist one or more web services 154 and the frequency 304 with which the web service processed queries containing the search string. So for example, searching database 74 for the query "napster" could identify a record that has the information:

| | |
|---|---|
| search string "napster" | |
| web service: News.com | frequency: 247 |
| web service: download.com | frequency: 3853 |
| web service: software.com | frequency: 14 |

In some embodiments of the present invention, information about the rank of a particular search term in each list 76 is stored in database 74. For example, the tenth most frequently searched term present in a list 76 will have a rank of ten whereas the twentieth most frequently searched term present in list 76 will have a rank of 20. Thus the record 302 in the database 74 for each search term includes a rank 306 and a frequency value 304 for each web service whose frequency list 76 includes that search term. Ranking information 306 is used in some instances in conjunction with or in lieu of frequency information 304 to assign a score to a particular web service 154. So, using the above example, a database 74 which is searched for the query "napster" could, in such embodiments, identify a record that has the information:

| | | |
|---|---|---|
| search string "napster" | | |
| web service: News.com | frequency: 247 | rank: 1 |
| web service: download.com | frequency: 3853 | rank: 75 |
| web service: software.com | frequency: 14 | rank: 125 |

In another embodiment, a score value is stored in the frequency database for each search term and web service instead of the rank and frequency values. The score value in this embodiment is computed as a function of the rank and frequency values for the search term and web service. For example, the score may be the rank divided by the logarithm of the frequency. In this example the web services with the "best" scores would be the ones with the lowest score value. In yet another embodiment, the frequency database stores rank, frequency and score values for each search term and web service.

Now that a system 20 and representative data structures have been presented in detail, processing steps in accordance with one embodiment of the present invention will be described with reference to FIG. 4. In processing step 402, a participating web service 154 periodically compiles a log of searches made by users accessing the web service. In processing step 404, the list is distilled by distiller module 70 (FIG. 1) into a frequency sorted list and merged into frequency database 74. In some embodiments, processing steps 402 and 404 are repeated periodically and frequency database 74 is completely rebuilt on a periodic basis with updated frequency lists 76.

Figure 4:
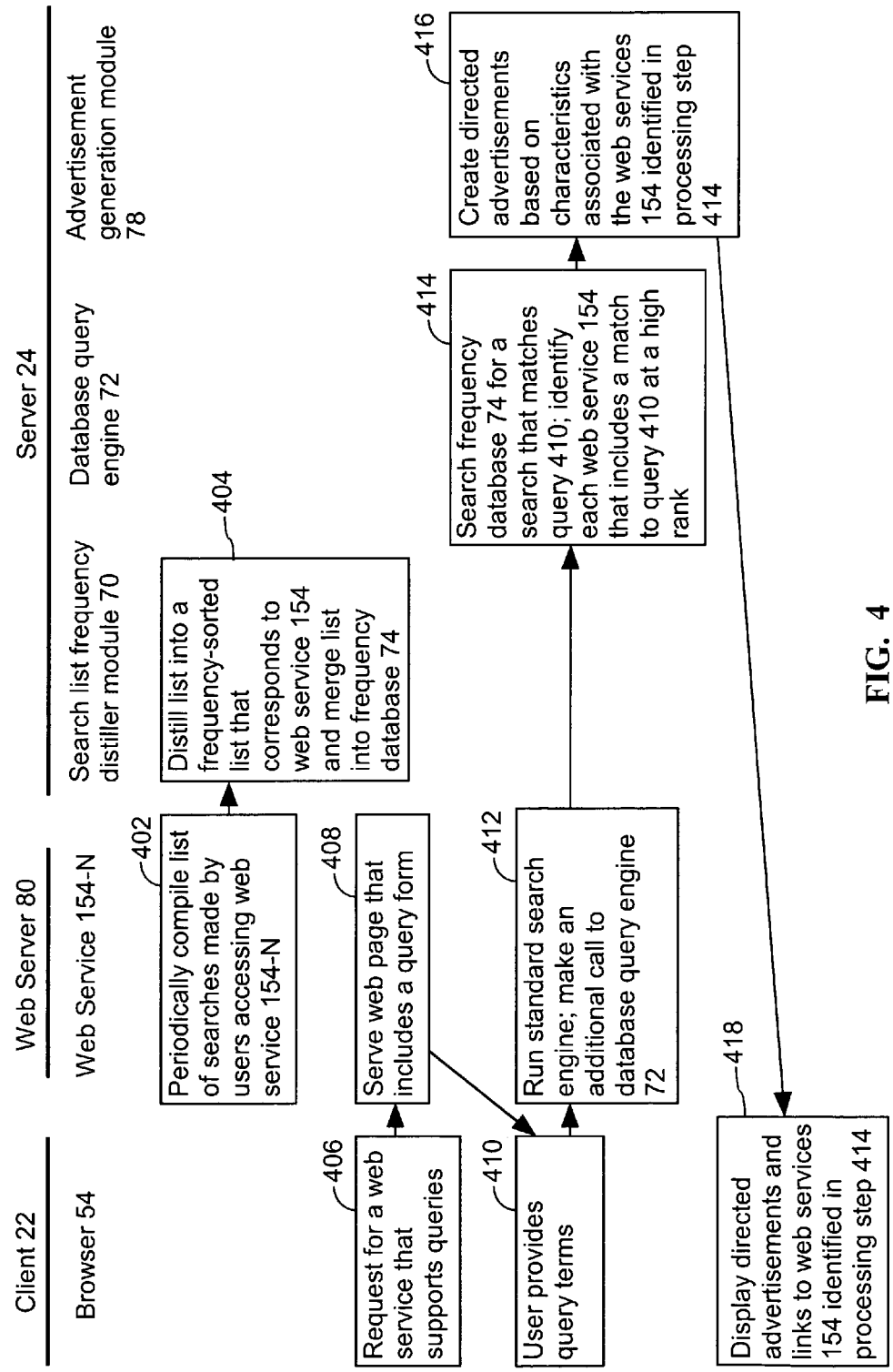
FIG. 4 illustrates the processing steps for distilling a set of lists into a frequency database and for using the frequency database to generate directed content in accordance with one embodiment of the present invention.

In FIG. 4, processing steps 406 through 418 occur independently of processing steps 402 and 404. In processing step 406, in response to a user request, browser 54 (FIG. 1) makes a request for a particular web service that supports queries. In response, web server 90 provides a web page that includes a query form. While the embodiment in FIG. 4 indicates that the web page served in processing step 408 is, in fact, served by a web service 154, it will be appreciated that there is no requirement that the web page served in processing step 408 be service by a web service 154 that participates as a web server in the service provided by server 24 (FIG. 1). The only requirements associated with the web page served in processing step 408 is that the web page supports queries and that the web page (i.e., the software module that processes the web page after a query has been submitted using the web page) has access to frequency database 74.

Returning to FIG. 4, the process continues in processing step 410 where the user provides query terms. Exemplary query terms include words such as "napster" and "presidential debate." In some embodiments, the search terms may include wild cards such as "*." For example, the query term may be "super*," which will identify all searches in database 74 that begin with the expression "super"

In processing step 412, the server uses its standard search engine to search for matches. For example, the standard search engine may search a web service specific database 156 (FIG. 1) associated with the web service for suitable content. In addition to the standard search performed by web service 154, a call is made to database query engine 72 in processing step 412. However, in some embodiments the server need not perform the "standard search engine" search prior to calling the database query engine to process the query.

In processing step 414, database query engine searches frequency database 74 (FIG. 3) for a search term record 302 that matches query 410. Once an appropriate matching record 302 in the database 74 has been identified, the web services 154 identified by that record are each assigned a score and the web services with the best scores are identified.

In one embodiment, a web service 154 is scored by the rank 306 originating from the position of the search on the associated list 76. So, for example, a web service 154 that corresponds to a matching search having a rank of 10 on the associated frequency list 76 will have a score of 10. Additionally, a web service 154 that corresponds to the same matching search but has a rank of 13 on the associated list will have a score of 13. In another embodiment, each web service is scored in accordance with the rank and frequency values in the relevant record of the frequency database by dividing the rank 306 by the logarithm of the frequency 304 (rank/log(frequency)). One of skill in the art will appreciate that many other scoring functions that are dependent upon frequency 304 and/or rank 306 are possible and all such scoring functions are within the scope of the present invention.

In processing step 416, web services 154 identified in processing step 414 are used to create directed content, and that directed content is then transmitted to the client computer that submitted the request in steps 406, 408 and 410. In one embodiment, web services 154 receiving the best scores in processing step 414 are categorized. Then, advertisements that correspond to these categories are sent to browser 54 of the client computer (FIG. 1) for display in processing step 418. In another embodiment, links to web services 154 receiving high scores are sent to the browser 54 of the client computer for display in processing step 418. The display of such links is highly advantageous because it provides the user with quick access to web services 154 most likely to contain useful information. In yet another embodiment, the query entered by the user in processing step 410 is routed to an instance of the web service 154 that received a high or best score during processing step 414. The response generated by the web service 154 after routing the query to the web service is then incorporated into a directed advertisement that is transmitted to the browser 54 of the client computer. This type of embodiment is advantageous in a number of different situations. For example, consider a case in which the query provided by a user during processing step 410 is "Harry Potter" during a period of time in which "Harry Potter" is a component of the title of a best selling paperback book. In all likelihood, an on-line book service such as Amazon.com will receive a high score during processing step 414 as numerous users request information on "Harry Potter" books. By routing the query terms "Harry Potter" to the Amazon.com query engine, the titles of available Harry Potter books are obtained and used as the basis of an advertisement that is transmitted to the client computer browser 54 for display during processing step 418.

Additional Examples

To illustrate the utility of the present invention, additional examples are provided. Consider a user query of the website Search.com using the query string "Winamp." After consultation of frequency database 74, a determination is made by directed content generation module 78 to show a music-related advertisement and to include a link to CNET download.com as a representation of one of the websites that should be searched. Also, consider a user query of the website Search.com using the query string "Chaise Lounge." After consultation of frequency database 74, a determination is made by directed content generation module 78 to run Amazon.com's "Lawn and Patio" search and format the results as a directed advertisement. Finally, consider a user query of the website CNET.com using the query string "Napster." After consultation of frequency database 74, directed content generation module 78 decides to show results for News.com first because of a recent trend in news related web sites for requests for Napster related news stories. Directed content generation module 78 further decides to show a link to the website Download.com because Napster is a popular download, as judged by the number of requests for Napster at Download.com Additional Methods for Identifying Relevant Web Services A major advantage of the present invention is the ability to generate highly directed advertisements. In one embodiment, the directed advertisements of the present invention are generated by routing a query provided by a user to an instance of a web service 154 that is highly relevant to a query made by a user. Processing step 414 (FIG. 4) represents one method for identifying highly relevant web services 154. However, there are many other methods for identifying highly relevant web services 154 based on a user provided query. For example, the user provided query can be routed to a resource such as the highly annotated Open Directory Project (dmoz.org) or some other ontological resource in order to identify a category or set of categories. Then, directed advertisements can be generated based on a category or set of categories.

For example, consider a user that provides a query term under conditions similar to those in processing step 410 (FIG. 4). Rather than searching a frequency database using the query, a local or remote instance of the Open Directory is consulted with the query and directory matches are obtained. For example, if the user provided query is "Audi", a seach of dmoz.org with the search string
<http://search.dmoz.org/cgi-bin/search?search=audi>.
will return:
1. Recreation: Autos: Makes and Models: Audi (13 matches)
2. Recreation: Autos: Clubs: Makes: Audi (4 matches)
3. Home: Consumer Information: Automobiles: Purchasing: By Make: Audi (1 match)
4. Regional: Europe: United Kingdom: Business and Economy: Motoring: Dealers: Audi (5 matches)
5. World: Nederlands: Recreatie: Auto's: Merken: Audi (4 matches)

In examining these search results, it is apparent that the highest concentration of the matches fall into results one and two (17 out of 27), so the inference can be made that "Recreation: Autos" is the relevant ontology node. Thus based on this ontology node, or category, an advertisement can be generated that is relevant to this category.

Thus, the present invention provides a method of generating a directed advertisement, in which a query is obtained from the user. The query is used to search a web resource such as the Open Directory Project or Frequency Database 74 (FIG. 1) for a match between the query and an element of the web resource such as a highly ranked web service 154 or category. Based on this match, a web service that is highly relevant to the user provided query is identified. In one embodiment, the query is routed to an instance of the identified web service and a response generated by the selected web service is collected. A portion of this response is then included in the directed advertisement.

Alternative Embodiments

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave. Furthermore, while examples provided herein describe the association of a list with a singular web service, it will be appreciated that there is no requirement that a list be associated with just one web service. Indeed, a single list can represent any number of web services. When this is the case, the list serves as a proxy for the plurality of web services.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of generating directed content, the method comprising:
receiving a set of lists of search terms from a plurality of remote web services that are adapted to receive submissions of at least one search term and perform a search for the search term submitted, each list of search terms in said set of lists being associated with, and maintained by, the respective web service, each list of search terms in said set of lists including search terms submitted to said respective web service that were used by said respective web service to perform searches;
distilling said set of lists of search terms into a frequency database, the database having search frequency information indicating, for respective search terms, a frequency with which each of the search terms were submitted to one or more of the plurality of remote web services for searching by the respective remote web service;
obtaining a query;
searching the frequency database for matches between said query and search terms in the database, the matches indicating that the obtained query was submitted as a search term to one or more of the plurality of remote web services;
selecting the matches between said query and search terms in which search terms have at least one of highest associated frequencies and highest rankings, each selected match indicating a respective selected remote web service to which said query was submitted as a search term; and
generating directed content based on one or more of the respective selected web services so that the directed content is generated based on the remote web services having at least one of the highest associated frequencies and the highest rankings for the obtained query;
wherein said directed content is linked to a remote web service.

2. The method of claim 1, wherein said directed content is a hyperlink to the linked remote web service, and the linked remote web service is a selected web service to which said query was submitted as a search term with high associated frequency.

3. The method of claim 1, said method further comprising identifying a category that corresponds to a selected web service; said directed content including an advertisement that corresponds to said category.

4. The method of claim 1, wherein said directed content is an advertisement, the method further comprising:
routing said query to an instance of a selected remote web service; and
collecting data generated by said selected remote web service in response to said query;
wherein said advertisement includes a portion of said response.

5. The method of claim 1, wherein a match having highest associated frequency is determined by a score that is a function of (i) a rank of a search term, which matches said query, in a list associated with a web service in said plurality of web services and (ii) the logarithm of the frequency of said search term in the list.

6. A method of generating directed content, the method comprising:
receiving a plurality of lists of search terms from a plurality of remote web services that are adapted to receive submissions of at least one search term and perform a search for the search term submitted, each list of search terms in said plurality of lists being associated with, and maintained by, the respective web service, each list of search terms in said plurality of lists including the search terms submitted to said respective web service that were used by said respective web service to perform searches;

distilling said plurality of lists of search terms into a frequency sorted list, the frequency sorted list including a plurality of entries, each entry having a search term and a number of times said search term was submitted to a respective web service for searching by the respective remote web service;

obtaining a query;

searching the frequency sorted list for matches between said query and a search term in the frequency sorted list, the matches indicating that the query was submitted as a search term to the respective remote web service;

selecting the matches between said query and search terms in which search terms have at least one of highest associated frequencies and highest rankings, each selected match indicating a respective selected web service to which said query was submitted as a search term; and generating directed content based on one or more of the respective selected remote web services so that the directed content is generated based on the remote web services having at least one of the highest associated frequencies and the highest rankings for the obtained query;

wherein said directed content is linked to a remote web service.

7. A computer program product for use in conjunction with a computer system, the computer program product comprising a computer readable storage medium and a computer program mechanism embedded therein, the computer program mechanism comprising:

a frequency database having search frequency information;

a program module for generating directed content, said program module comprising:

instructions for receiving a set of lists of search terms from a plurality of remote web services that are adapted to receive submissions of at least one search term and perform a search for the search term submitted, each list of search terms in said set of lists associated with, and maintained by, the respective web service, each list of search terms in said set of lists including search terms submitted to said respective web service that were used by said respective web service to perform searches;

instructions for distilling said set of lists into said frequency database, the database having search frequency information indicating, for respective search terms, a frequency with which each of the search terms were submitted to one or more of the plurality of remote web services for searching by the respective remote web service;

instructions for obtaining a query;

instructions for searching the frequency database for matches between said query and search terms in the database, the matches indicating that the query was submitted as a search term to one or more of the plurality of remote web services;

instructions for selecting the matches between said query and search terms in which search terms have at least one of highest associated frequencies and highest rankings, each selected match indicating a respective selected remote web service to which said query was submitted as a search term; and instructions for generating directed content based on one or more of the respective selected remote web services so that the directed content is generated based on the remote web services having at least one of the highest associated frequencies and the highest rankings for the obtained query, wherein said directed content is linked to a remote web service.

8. The computer program product of claim 7, wherein said directed content is a hyperlink to the linked remote web service, and the remote web service is a selected web service to which said query was submitted as a search term with high associated frequency.

9. The computer program product of claim 7, wherein said program module further comprises instructions for identifying a category that corresponds to a selected remote web service; said directed content including an advertisement that corresponds to said category.

10. The computer program product of claim 7, wherein said directed content is an advertisement, the program module further comprising:

instructions for routing said query to an instance of a selected remote web service; and instructions for collecting data generated by said selected remote web service in response to said query; wherein said advertisement includes a portion of said response.

11. The computer program product of claim 7, wherein a match having highest associated frequency is determined by a score that is a function of (i) a rank of a search term, which matches said query, in a list associated with a web service in said plurality of web services and (ii) the logarithm of the frequency of said search term in the list.

12. A computer program product for use in conjunction with a computer system, the computer program product comprising a computer readable storage medium and a computer program mechanism embedded therein, the computer program mechanism comprising:

a frequency sorted list of search terms having search frequency information;

a program module for generating directed content, said program module comprising:

instructions for receiving a plurality of lists of search terms from a plurality of remote web services that are adapted to receive submissions of at least one search term and perform a search for the search term submitted, each list of search terms in said plurality of lists being associated with, and maintained by, the respective web service, each list of search terms in said plurality of lists including search terms submitted to said respective web service that were used by said respective web service to perform searches;

instructions for distilling said plurality of lists into said frequency sorted list, the frequency sorted list including a plurality of entries, each entry having a search term and a number of times said search term was submitted to a respective web service for searching by the respective web service;

instructions for obtaining a query;

instructions for searching the frequency sorted list for matches between said query and search terms in the frequency sorted list, the matches indicating that the query was submitted as a search term to the respective web service;

instructions for selecting the matches between said query and search terms in which search terms have at least one of highest associated frequencies and highest rankings, each selected match indicating a respective selected remote web service to which said query was submitted as a search term; and instructions for generating directed content based on one or more of the respective selected remote web services so that the directed content is generated based on the remote web services having at least one of the highest associated frequencies and the highest rankings for the obtained query, wherein said directed content is linked to a remote web service.

13. A computer system for generating directed content, the computer system comprising:
- a central processing unit;
- a memory, coupled to the central processing unit, the memory having:
  - a frequency database including search term frequency information;
  - a program module for generating said directed content, said program module comprising:
    - instructions for receiving a set of lists of search terms from plurality of remote web services that are adapted to receive submissions of at least one search term and perform a search by a respective web service to which the search term is submitted, each list of search terms in said set of lists being associated with, and maintained by, the respective web service, each list of search terms in said set of lists including search terms submitted to said respective web service that were used by the respective remote web service to perform searches;
    - instructions for distilling said set of lists into said frequency database, the frequency database having search frequency information indicating, for respective search terms, a frequency with which each of the search terms were submitted to one or more of the plurality of remote web services for searching by the respective remote web services;
    - instructions for obtaining a query;
    - instructions for searching the frequency database for matches between said query and search terms in the database, the matches indicating that the query was submitted as a search term to the respective web service;
    - instructions for selecting the matches between said query and search terms in which search terms have at least one of highest associated frequencies and highest rankings, each selected match indicating a respective selected remote web service to which said query was submitted as a search term; and
    - instructions for generating directed content based on one or more the respective selected remote web services so that the directed content is generated based on the remote web services having at least one of the highest associated frequencies and the highest rankings for the obtained query;
  - wherein said directed content is linked to a remote web service.

14. The computer system of claim 13 wherein said directed content is a hyperlink to the linked remote web service, and the linked remote web service is a selected web service to which said query was submitted as a search term with high associated frequency.

15. The computer system of claim 13 wherein said program module further comprises instructions for identifying a category that corresponds to a selected remote web service; said directed content including an advertisement that corresponds to said category.

16. The computer system of claim 13, wherein said directed content is an advertisement, the program module further comprising:
- instructions for routing said query to an instance of a selected remote web service; and
- instructions for collecting data generated by said selected remote web service in response to said query; wherein said advertisement includes a portion of said response.

17. The computer system of claim 13 wherein a match having highest associated frequency is determined by a score that is a function of (i) a rank of a search term, which matches said query, in a list associated with a web service in said plurality of web services and (ii) the logarithm of the frequency of said search term in the list.

18. A computer system for generating directed content, the computer system comprising:
- a central processing unit;
- a memory, coupled to the central processing unit, the memory having:
  - a frequency sorted list of search terms including search frequency information;
  - a program module for generating said directed content, said program module comprising:
    - instructions for receiving a plurality of lists of search terms from a plurality of remote web services that are adapted to receive submission of at least one search term and performs a search, each list of search terms in said plurality of lists being associated with, and maintained by, a respective web service in the plurality of remote web services and each list of search terms in said plurality of lists including the search term submitted to said respective web service that was used by said respective web service to perform a search;
    - instructions for distilling said plurality of lists of search terms into said frequency sorted list, the frequency sorted list including a plurality of entries, each entry having a search term and a number of times said search term was submitted to, and searched by, a respective web service;
    - instructions for obtaining a query;
    - instructions for searching the frequency sorted list for matches between said query and a search term in the frequency sorted list, the matches indicating that the query was submitted as a search term to the respective web service;
    - instructions for selecting the matches between said query and search terms in which search terms have at least one of highest associated frequencies and highest rankings, each selected match indicating a respective selected remote web service of the web services to which said query was submitted as a search term; and
    - instructions for generating directed content based on one or more of the respective selected remote web services so that the directed content is generated based on the remote web services having at least one of the highest associated frequencies and the highest rankings for the obtained query;
  - wherein said directed content is linked to a remote web service.

19. A method of generating a directed advertisement, the method comprising:
- obtaining a query;
- searching a web resource for a match between said query and an element of said web resource;

selecting a remote web service based on said element of said web resource, said remote web service being adapted to receive submissions of at least one search term and perform a search for the search term submitted, said selected remote web service having at least one of highest associated frequencies of matches and highest rankings of matches between said query and search terms submitted to said remote web service compared to remote web services not selected;

routing said query to an instance of said selected web service;

searching the selected remote web service for the query;

collecting data generated by said selected remote web service in response to said query; and generating said directed advertisement, said directed advertisement including a portion of said data generated in response to the query within said advertisement.

20. The method of claim 19, wherein said element of said web resource is a category.

21. The method of claim 19, wherein said web resource is the Open Directory Project.

22. The method of claim 19, wherein said web resource is a frequency database, the database having search frequency information indicating, for respective search terms, a frequency with respect to each of one or more of a plurality of web services to which the respective search terms were submitted; and said element of said resource is an entry in the frequency database corresponding to said selected remote web service, said search frequency information stored in said frequency database indicating that a search for said search term has been conducted at said selected web service at a high frequency relative to other web services of said plurality of web services.

23. A computer program product for use in conjunction with a computer system, the computer program product comprising a computer readable storage medium and a computer program mechanism embedded therein, the computer program mechanism comprising:

a program module for generating a directed advertisement, said program module comprising:

instructions for obtaining a query;

instructions for searching a web resource for a match between said query and an element of said web resource;

instructions for selecting a remote web service based on said element of said web resource, said remote web service being adapted to receive submissions of at least one search term and perform a search for the search term submitted, said selected remote web service having at least one of highest associated frequencies of matches and highest rankings of matches between said query and search terms submitted to said remote web service compared to remote web services not selected;

instructions for routing said query to an instance of said selected web service;

instructions for searching the selected remote web service for the query;

instructions for collecting data generated by said selected remote web service in response to said query; and instructions for generating said directed advertisement, said directed advertisement including a portion of said data generated in response to said query within said advertisement.

24. The computer program product of claim 23, wherein said element of said web resource is a category.

25. The computer program product of claim 23, wherein said web resource is a frequency database, the database having search frequency information indicating, for respective search terms, a frequency with respect to each of one or more of a plurality of remote web services to which the respective search terms were submitted; and said element of said resource is an entry in the frequency database corresponding to said selected remote web service, said search frequency information stored in said frequency database indicating that search for said search term has been conducted at said selected remote web service at a high frequency relative to other web services of said plurality of remote web services.

26. A computer system for generating directed content, the computer system comprising:

a central processing unit;

a memory, coupled to the central processing unit, the memory having:

a program module for generating said directed content, said program module comprising:

instructions for obtaining a query;

instructions for searching a web resource for a match between said query and an element of said web resource;

instructions for selecting a remote web service based on said element of said web resource, said remote web service being adapted to receive submissions of at least one search term and perform a search for the search term submitted, said selected remote web service having at least one of highest associated frequencies of matches and highest rankings of matches between said query and search terms submitted to said remote web service compared to remote web services not selected;

instructions for routing said query to an instance of said selected web service;

instructions for searching the selected remote web service for the query;

instructions for collecting data generated by said selected remote web service in response to said query; and instructions for generating said directed advertisement, said directed advertisement including a portion of said data generated in response to said query within said advertisement.

27. The computer system of claim 26, wherein said element of said web resource is a category.

28. The computer system of claim 26, wherein said web resource is a frequency database, the database having search frequency information indicating, for respective search terms, a frequency with respect to each of one or more of a plurality of web services to which the respective search terms were submitted; and said element of said resource is an entry in the frequency database corresponding to said selected remote web service, said search frequency information stored in said frequency database indicating that search for said search term has been conducted at said selected remote web service at a high frequency relative to other web services of said plurality of web services.

29. The computer program product of claim 23, wherein said web resource is the Open Directory Project.

30. The computer system of claim 26, wherein said web resource is the Open Directory Project.

31. A method of generating a directed advertisement, the method comprising:
- obtaining a query;
- selecting a remote web service based on said query, said remote web service being adapted to receive submissions of at least one search term and perform a search for the search term submitted, said selected remote web service having at least one of highest associated frequencies of matches and highest rankings of matches between said query and search terms submitted to said remote web service compared to remote web services not selected;
- routing said query to an instance of said selected remote web service;
- searching the selected remote web service for the query;
- collecting data generated by said selected remote web service in response to said query; and
- generating said directed advertisement, said directed advertisement including a portion of said data generated in response to said query within said advertisement.

32. A computer program product for use in conjunction with a computer system, the computer program product comprising a computer readable storage medium and a computer program mechanism embedded therein, the computer program mechanism comprising:
- a program module for generating a directed advertisement, said program module comprising:
  - instructions for obtaining a query;
  - instructions for selecting a remote web service based on said query, said remote web service being adapted to receive submissions of at least one search term and perform a search for the search term submitted, said selected remote web service having at least one of highest associated frequencies of matches and highest rankings of matches between said query and search terms submitted to said remote web service compared to remote web services not selected;
  - instructions for routing said query to an instance of said selected remote web service;
  - instructions for searching the selected remote web service for the query;
  - instructions for collecting data generated by said selected remote web service in response to said query; and
  - instructions for generating said directed advertisement, said directed advertisement including a portion of said data generated in response to said query within said advertisement.

33. A computer system for generating directed content, the computer system comprising:
- a central processing unit;
- a memory, coupled to the central processing unit, the memory having:
  - a program module for generating said directed content, said program module comprising:
    - instructions for obtaining a query;
    - instructions for selecting a remote web service based on said query, said remote web service being adapted to receive submissions of at least one search term and perform a search for the search term submitted, said selected remote web service having at least one of highest associated frequencies of matches and highest rankings of matches between said query and search terms submitted to said remote web service compared to remote web services not selected;
    - instructions for routing said query to an instance of said selected web service;
    - instructions for searching the selected remote web service for the query;
    - instructions for collecting data generated by said selected remote web service in response to said query; and
    - instructions for generating said directed advertisement, said directed advertisement including a portion of said data generated in response to said query within said advertisement.

34. The method of claim 1 wherein each remote web service in said plurality of web services is a search engine.

35. The method of claim 6 wherein each remote web service in said plurality of remote web services is a search engine.

36. The computer program product of claim 7 wherein each remote web service in said plurality of remote web services is a search engine.

37. The computer program product of claim 12 wherein each remote web service in said plurality of remote web services is a search engine.

38. The computer system of claim 13 wherein each remote web service in said plurality of remote web services is a search engine.

39. The computer system of claim 18 wherein each remote web service in said plurality of remote web services is a search engine.

40. The method of claim 19 wherein said remote web service is a search engine.

41. The computer program product of claim 23 wherein said remote web service is a search engine.

42. The computer system of claim 26 wherein said remote web service is a search engine.

43. The method of claim 31 wherein said remote web service is a search engine.

44. The computer program product of claim 32 wherein said web resource is a search engine.

45. The computer system of claim 33 wherein said remote web service is a search engine.

* * * * *